United States Patent
Horney et al.

[11] Patent Number: 5,775,653
[45] Date of Patent: Jul. 7, 1998

[54] CLAMP DEVICE FOR ATTACHING AND POSITIVELY ORIENTING A VEHICULAR COMPONENT TO A TUBULAR MEMBER

[75] Inventors: Kenneth Horney, Harrison Township; Thomas M. Knowles, Sterling Heights, both of Mich.

[73] Assignee: Chrysler Corporation, Auburn Hills, Mich.

[21] Appl. No.: 656,940

[22] Filed: May 30, 1996

[51] Int. Cl.⁶ .................................................. B65D 63/00
[52] U.S. Cl. ................... 248/230.8; 248/74.3; 24/16 PB
[58] Field of Search .......................... 248/230.8, 230.9, 248/74.3; 24/16 PB, 20 TT

[56] References Cited

U.S. PATENT DOCUMENTS

| | | | |
|---|---|---|---|
| 3,149,808 | 9/1964 | Weckesser | 248/74.3 |
| 3,471,109 | 10/1969 | Meyer | 24/16 PB |
| 3,913,187 | 10/1975 | Okuda | 24/255 |
| 3,925,851 | 12/1975 | Bevans | 24/20 TT |
| 4,779,828 | 10/1988 | Munch | 24/16 PB |
| 4,784,358 | 11/1988 | Kohut | 248/74.3 |
| 4,840,345 | 6/1989 | Neil et al. | 248/74.2 |
| 5,016,843 | 5/1991 | Ward | 248/68.1 |
| 5,024,405 | 6/1991 | McGuire | 24/16 PB |
| 5,042,114 | 8/1991 | Parrish | 248/74.3 |
| 5,135,188 | 8/1992 | Anderson et al. | 248/74.3 |
| 5,332,179 | 7/1994 | Kuffel et al. | 248/74.3 |
| 5,367,750 | 11/1994 | Ward | 24/16 PB |

Primary Examiner—Victor N. Sakran

[57] ABSTRACT

A clamp device for attaching a vehicular component to a tubular member. The clamp device includes a split ring that has a latch end member, a tab end member, and a device disposed on the latch end member and the tab end member for interengaging the latch end member and the tab end member when the ring is closed around the tubular member. The clamp device further includes a component retention member that is fixedly attached to the ring for positively orienting the component on the tubular member. The retention member has a support member that is integrally formed with the ring, and a housing member that is affixed to the support member. The housing member includes a device for slidably receiving and releasably attaching the component to the ring.

4 Claims, 2 Drawing Sheets

CLAMP DEVICE FOR ATTACHING AND POSITIVELY ORIENTING A VEHICULAR COMPONENT TO A TUBULAR MEMBER

BACKGROUND OF THE INVENTION

1. Field of the Invention

In general, the present invention relates to clamp devices. Specifically, the present invention relates to a clamp device for slidably receiving, releasbly attaching, and positively orienting a vehicular component to a tubular member.

2. Description of the Related Art

Engine compartments of vehicles are becoming increasingly crowded with components. Moreover, engine compartments are becoming smaller due to vehicle styling features. The demands of government regulations and the increased use of high technology sought by those who operate the vehicles have caused a number of new components to be introduced into typical engine compartments. Thus, there is a great need to affix smaller components to non-moving parts of the vehicle to free-up space in the engine compartment. In addition, some of these smaller components must be positively oriented in space so that they will function properly and meet government regulations. For example, Electronic EGR Transducers must stay in a horizontal position with respect to the vehicle to meet government regulations and function properly. In view of the above, it has been recognized that current engines have numerous hoses that take up substantial space in the engine compartment but cannot be used for attaching small devices onto because of their tubular shape.

In the past, squeeze action clamps have been employed, such as U.S. Pat. No. 4,840,345 to Neil et al. and U.S. Pat. No. 3,913,187 to Okuda, to clamp two joining hoses together. Moreover, in the electrical art, wire harness clips have been invented such as shown in U.S. Pat. No. 5,367,750 to Ward. However, none of these patents permit slidingly attaching a vehicle component to a tubular object via a hose clamp, permit positive orientation of the component in the vehicle, or provide a simple means for releasably removing the component from the tubular member for servicing or replacement.

SUMMARY OF THE INVENTION

The present invention provides a clamp device for attaching a vehicular component to a tubular member. The clamp device includes a split ring that has a latch end member and a tab end member. A device is disposed on the latch end member and the tab end member for interengaging the latch end member and the tab end member when the ring is closed around the tubular member. The clamp device further includes a component retention member that is fixedly attached to the ring for positively orienting the vehicular component on the tubular member. The retention member has a support member that is integrally formed with the ring, and a housing member that is affixed to the support member. The housing member includes a device for slidably receiving and releasably attaching the component to the ring.

Other objects, features and advantages of the present invention will become apparent by reference to the following detailed description when considered in conjunction with the accompanying drawings.

DESCRIPTION OF THE PREFERRED EMBODIMENT(S)

Figure 1:
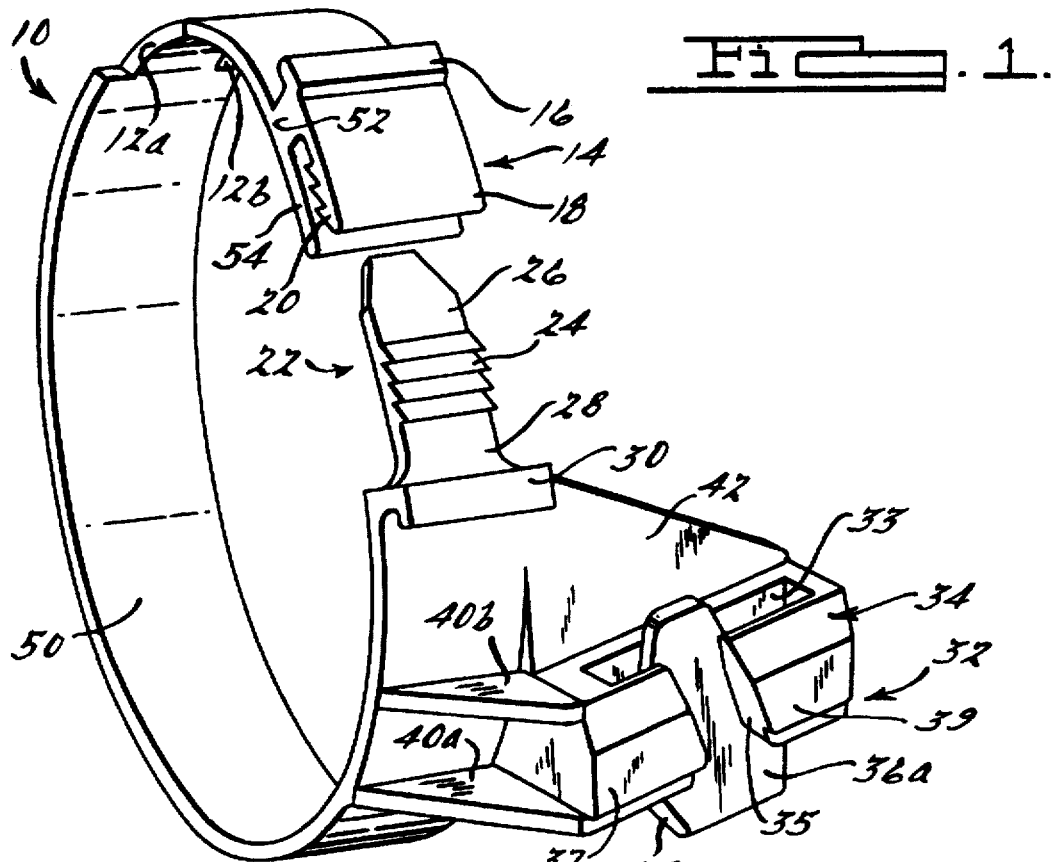
FIG. 1 is a perspective view of a clamp device of the present invention.

Commencing with FIG. 1, a clamp device 10 is shown. The clamp device 10 comprises a split ring 50 that has a latch end member 14, which defines a first free end of the split ring 50 and a tab end member 22, which defines a second free end of the ring 50. The tab end member 22 includes means disposed thereon for interengaging the latch end member 14 and a tab end member 22 when the ring 50 is closed around the tubular member 44, which, in the preferred embodiment, comprises a plurality of teeth 24 that are integrally formed with, and protrude radially outwardly from, the tab end member 22. The tab end member 22 further includes a latch insertion end 26 and a ring attachment end 28. The ring attachment end 28 is intregally formed between the ring 50 and the latch insertion end 26.

Figure 2:
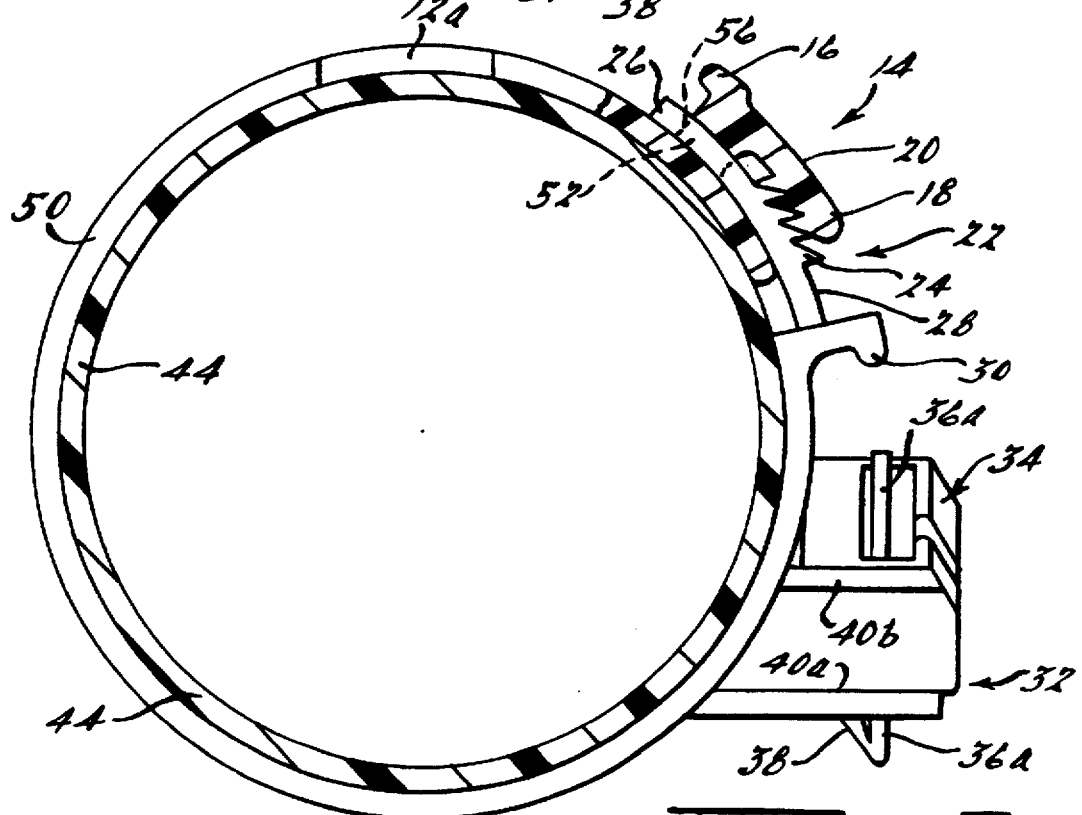
FIG. 2 is a side elevational view of the clamp device of the present invention showing a split ring of the clamp device closed around a tubular member with a web portion of a latch end member broken away to show a tab end member inserted therethrough.

The latch end member 14 comprises an operator grip flange 16 that is integrally formed with a cover 18. As will be noted, the cover 18 of the latch end member 14 is spaced from an end portion 54 of the ring 50 by a web 52 that is interimposed between the cover 18 and the end portion 54. As shown in FIG. 2, this arrangement defines a slot to receive the tab end member 22 therethrough when the latch end member 14 and the tab end member 22 interengage in overlapped relationship when the ring 50 is closed around the tubular member 44 and the latch insertion end 26 is inserted through the defined slot of the latch end member 14. An opening 56 is provided in the web 52 to permit member 22 to pass therethrough and thus provide for tight, adjustable engagement of the ring 50 around tubular member 44.

Figure 3:
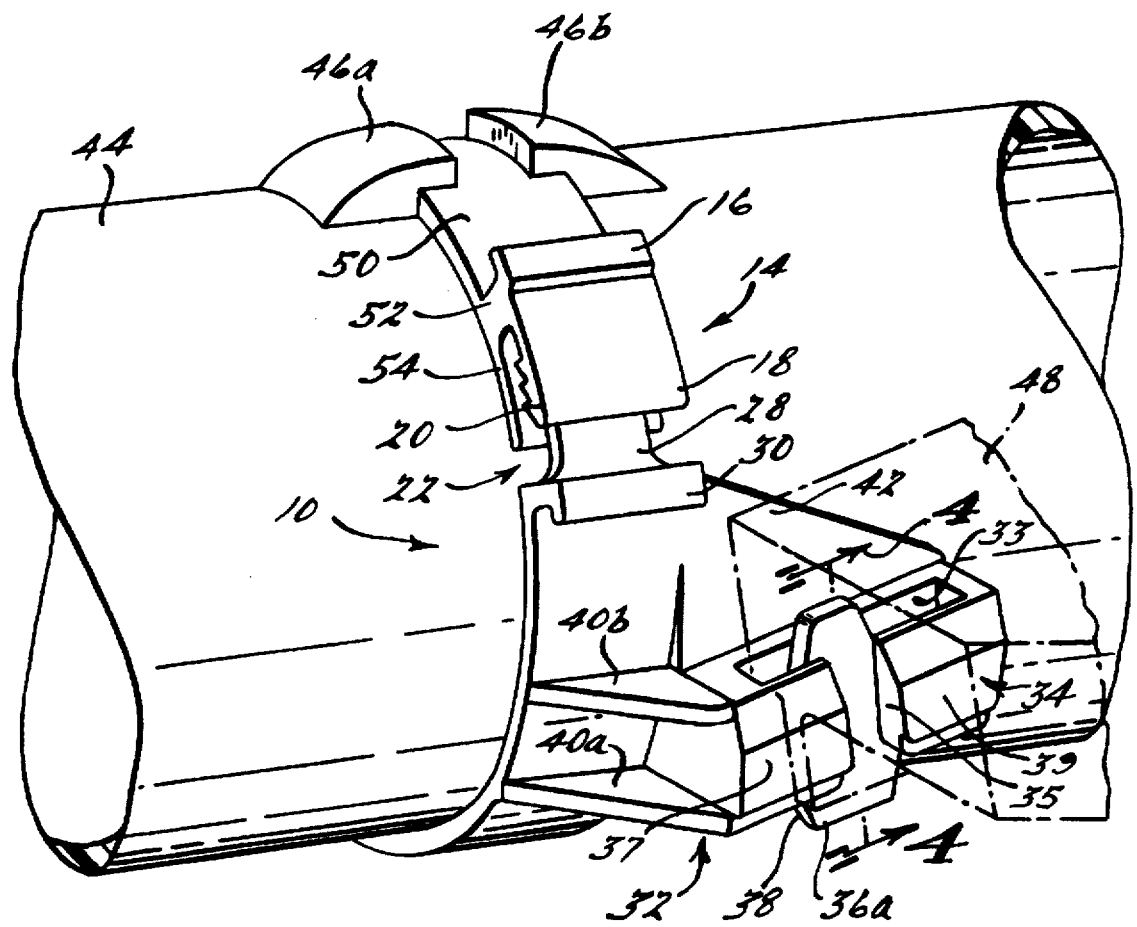
FIG. 3 is a perspective view of the split ring of the present invention closed around a tubular member showing (in phantom) a vehicular component that is slidingly received by and releasably attached to a component retention member of the clamp device.

As shown in FIG. 1, the terminating end portion 54 is integrally formed with the ring 50. The latch end member 14 and the tab end member 22 are adapted to interengage in overlapped relationship when the ring 50 is closed around the tubular member 44 as best shown in FIG. 2. A latch abutment flange 30 is fixedly attached to the ring 50 for limiting interengagment of the latch end member 14 in the tab end member 22. The latch end member 14 includes means disposed thereon for interengaging the latch end member 14 with the tab end member 22 when the ring 50 is closed around a tubular member 44 (such as an air or fluid hose in the engine compartment of a vehicle) as shown in FIGS. 2 and 3. In the preferred embodiment the means for interengaging the latch end member 14 and the tab end member 22 comprises a plurality of radially inwardly projecting teeth 20 that are integrally formed with and protrude from the underside of the latch end member 14 and the cover 18.

Figure 4:
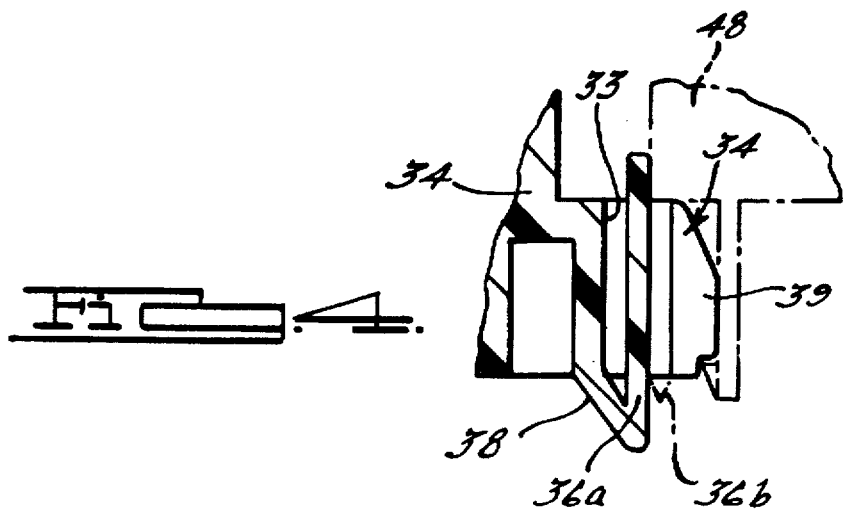
FIG. 4 is a cross-sectional view of the component retention member showing (in phantom) a tab of the vehicular component abutting against a flexible tab of the component retention member taken along sight line 4—4 of FIG. 3 of the present invention.

The clamp device 10 further includes a component retention member 32 that is fixedly attached to the ring 50 for positively orienting a vehicular component 48 on the tubular member 44. The retention member 32 has a support member 42 that is integrally formed with the ring 50. In the preferred embodiment, the support member 42 is angled with respect to the ring 50. The component retention member 32 further includes a housing 34 that is affixed to the support member 42. The housing 34 includes means for slidably receiving and releasably attaching the component 48 to the ring 50. As will be noted, the housing 34 is generally rectangular and has a central slot 33 extending therethrough. The outermost side of the housing 34 is defined by a pair of arms 37, 39. The ends of the arms 37, 39 do not meet and are separated by a gap 35. In the preferred embodiment, as shown in FIG. 4, the means for slidably receiving and releasably attaching the component 48 to the ring 50 consist of the housing 34 being adapted for receiving the component 48 when an opposing tab 36b disposed on the component 48 is biased against a flexible, inclined tab 36a that is attached to the housing 34 and extends through the slot 33. The inclined tab 36a is attached to a tab-to-housing protrusion 38 that extends from the housing 34. When the tab 36b of the vehicular component 48 is slidably received in slot 33 of the housing 34, frictional engagement is created between the inclined tab 36a and arms 37,39 and the tab 36b. The inclined tab 36a is thereby flexed inward toward the ring 50. The component retention member 32 also includes a first support wedge 40a that is attached to the ring 50 and a second support wedge 40b that is attached to the ring 50 and is laterally spaced from the first support wedge 40a. As shown in FIGS. 1 and 3, the housing 34 is affixed to and interposed between the first and second support wedges 40a, 40b and the angled support member 42.

As shown in FIG. 3, the tubular member 44 has a first flexible ring retention member 46a protruding therefrom and an opposing, longitudinally space second flexible ring retention member 46b that also protrudes from the tubular member 44. As seen in FIGS. 1 and 2, the ring 50 includes two opposing adjacent notches 12a, 12b disposed therein for positively locating the ring 50 on the tubular member 44 when the two notches 12a, 12b are disposed between the first flexible ring retention member 46a and the second flexible member 46b of the tubular member 44. This positive locating of the ring 50 on the tubular member 44 results in a positive locating of the vehicular component 48 that is releasably attached to the ring 50 via the component retention member 32 as shown in FIG. 3. The ring retention members 46a, 46b and the ring notches 12a, 12b can also be of different sizes so that only the larger notch will engage the larger retention member. Such an arrangement will thereby only allow the ring 50 to be closed around the tubular member 44 in one direction providing further orientation of the vehicular component 48.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A clamp device for attaching a vehicular component to a tubular member, the tubular member having a first flexible ring retention member protruding therefrom and an opposing, longitudinally spaced second flexible ring retention member protruding therefrom, the clamp device comprising:

(A) a split ring comprising:
 (i) a latch end member defining a first free end of the split ring,
 (ii) a tab end member defining a second free end of the split ring, and
 (iii) means disposed on the latch end member and the tab end member for interengaging the latch end member and the tab end member when the ring is closed around the tubular member, and
 (iv) two opposing, adjacent notches disposed therein for positively locating the ring on the tubular member when the two notches are disposed between the first flexible ring retention member and the second flexible ring retention member of the tubular member; and (B) a component retention member fixedly attached to the ring for positively orienting the component on the tubular member, the retention member comprising:
 (i) a support member integrally formed with the ring, and
 (ii) a housing affixed to the support member, the housing having means for slidably receiving and releasably attaching the component to the ring.

2. The clamp device of claim 1 wherein the means for interengaging the latch end member and the tab end member when the ring is closed around the tubular member comprises a plurality of teeth integrally formed with and protruding radially inwardly from the latch end member and a plurality of teeth integrally formed with and protruding radially outwardly from the tab end member.

3. The clamp device of claim 1 wherein the means for slidably receiving and releasably attaching the component to the ring consists of the the housing having an attached, flexible, inclined tab for biasing against an opposing tab disposed on the vehicular component.

4. A clamp device for attaching a vehicular component to a tubular member, the tubular member having a first flexible ring retention member protruding therefrom and an opposing, longitudinally spaced second flexible ring retention member protruding therefrom, the clamp device comprising:

(A) a split ring comprising:
 (i) a latch end member defining a first free end of the split ring, the latch end including an end portion, a cover member spaced from the end portion by a web that is interimposed between the cover member and the end portion to define a slot, a plurality of teeth integrally formed with and protruding radially inwardly from underneath the cover member, and an operator grip flange integrally formed with the cover,
 (ii) a tab end member defining a second free end of the split ring, the tab end member including a latch insertion end, a plurality of teeth integrally formed with and protruding radially outwardly from the latch insertion end, and a ring attachment end integrally formed between the ring and the latch insertion end, the latch end member and the tab end member being adapted to interengage in overlapped relationship when the ring is closed around the tubular member and the latch insertion end is inserted through the defined slot of the latch end member,
 (iii) two opposing, adjacent notches disposed therein for positively locating the ring on the tubular member when the two notches are disposed between the first flexible ring retention member and the second flexible ring retention member of the tubular member, and and an opposing, longitudinally spaced second flexible ring retention member protruding therefrom, the clamp device comprising:

(A) a split ring comprising:
  (i) a latch end member defining a first free end of the split ring, the latch end including an end portion, a cover member spaced from the end portion by a web that is interimposed between the cover member and the end portion to define a slot, a plurality of teeth integrally formed with and protruding radially inwardly from underneath the cover member, and an operator grip flange integrally formed with the cover,
  (ii) a tab end member defining a second free end of the split ring, the tab end member including a latch insertion end, a plurality of teeth integrally formed with and protruding radially outwardly from the latch insertion end, and a ring attachment end integrally formed between the ring and the latch insertion end, the latch end member and the tab end member being adapted to interengage in overlapped relationship when the ring is closed around the tubular member and the latch insertion end is inserted through the defined slot of the latch end member,
  (iii) two opposing, adjacent notches disposed therein for positively locating the ring on the tubular member when the two notches are disposed between the first flexible ring retention member and the second flexible ring retention member of the tubular member, and
  (iv) a latch abutment flange fixedly attached to the ring for limiting interengagement of the latch end member and the tab end member; and (B) a component retention member fixedly attached to the ring for positively orienting the component on the tubular member, the retention member comprising:
  (i) a first support wedge attached to the ring,
  (ii) a second support wedge attached to the ring,
  (iii) an angled support member integrally formed with the ring, and
  (iv) a gapped, rectangular housing affixed to and interposed between the first and second support wedges and the support member, the housing including a flexible, inclined tab for slidably receiving and releasably attaching the component to the ring when an opposing tab disposed on the component is biased against the inclined tab, and a tab-to-housing protrusion extending from the housing, the tab-to-housing protrusion being attached to the inclined tab.

* * * * *